(12) United States Patent
Dupuis (10) Patent No.: US 11,959,517 B2
(45) Date of Patent: Apr. 16, 2024

(54) APPARATUS AND METHOD FOR ASSEMBLING A SPLIT SLEEVE ONTO A SHAFT

(71) Applicant: Hydro Tech Inc., Sault Ste. Marie (CA)

(72) Inventor: Michael August Dupuis, Sault Ste. Marie (CA)

(73) Assignee: Hydro Tech Inc., Sault Ste. Marie (CA)

( * ) Notice: Subject to any disclaimer, the term of this patent is extended or adjusted under 35 U.S.C. 154(b) by 0 days.

(21) Appl. No.: 18/178,987

(22) Filed: Mar. 6, 2023

(65) Prior Publication Data

US 2023/0204070 A1 Jun. 29, 2023

Related U.S. Application Data (62) Division of application No. 17/324,325, filed on May 19, 2021, now Pat. No. 11,703,086.

(51) Int. Cl.
*F16C 33/04* (2006.01)
*F16C 33/12* (2006.01)
*F16C 43/02* (2006.01)

(52) U.S. Cl.
CPC .......... *F16C 33/046* (2013.01); *F16C 33/121* (2013.01); *F16C 43/02* (2013.01);
(Continued)

(58) Field of Classification Search
CPC .... F16C 17/022; F16C 33/046; F16C 33/121; F16C 43/02; F16C 2202/22; F16C 2226/62; F16C 2226/70–78
See application file for complete search history.

(56) References Cited

U.S. PATENT DOCUMENTS

| 1,213,684 A | 1/1917 | Osterholm |
| 1,298,100 A | 3/1919 | Royce |
(Continued)

FOREIGN PATENT DOCUMENTS

| CN | 208669853 U | 3/2019 |
| GB | 2139297 A | 11/1984 |
(Continued)

OTHER PUBLICATIONS

RENK—Type E Slide Bearings, p. 4.
(Continued)

*Primary Examiner* — Alan B Waits
(74) *Attorney, Agent, or Firm* — Young Basile Hanlon & MacFarlane, P.C.

(57) ABSTRACT

An apparatus and method for assembling a split sleeve onto a shaft. The split sleeve apparatus provides a first and second arcuate portion with each having a partial cylindrical configuration. The first and second arcuate portions have at least one finger extending circumferentially outward from their opposing ends. The at least one finger from each of the first and second arcuate portions complementarily engage one another to form a continuous cylinder. At least one aperture extends longitudinally through the at least one finger of the first and second arcuate portions. A dowel rod extends through the at least one aperture for connecting the first and second arcuate portions to form the cylinder. The first and second arcuate portions are fabricated from a material having heat expansion characteristics that allow the material to expand when heated during assembly and to contract when cooled creating an interference fit with the shaft.

19 Claims, 4 Drawing Sheets

(52) U.S. Cl.
CPC ...... *F16C 2202/22* (2013.01); *F16C 2226/62* (2013.01); *F16C 2226/78* (2013.01)

(56) References Cited

U.S. PATENT DOCUMENTS

| | | | |
|---|---|---|---|
| 2,481,931 A * | 9/1949 | Kester | F16C 33/06 |
| | | | 29/447 |
| 2,855,252 A | 10/1958 | Budinger et al. | |
| 5,851,084 A | 12/1998 | Nishikawa | |
| 7,037,026 B2 | 5/2006 | Ostling et al. | |
| 2006/0257058 A1* | 11/2006 | Seilheimer | F16C 17/022 |
| | | | 384/276 |
| 2010/0069167 A1* | 3/2010 | Williams | E21B 33/085 |
| | | | 464/163 |
| 2010/0272383 A1 | 10/2010 | Mock | |
| 2011/0194792 A1* | 8/2011 | Hauk | B21D 53/10 |
| | | | 384/276 |
| 2018/0164451 A1* | 6/2018 | Lyssy | F16H 1/26 |
| 2019/0145460 A1* | 5/2019 | Wesstrom | F16G 15/00 |
| | | | 248/298.1 |
| 2023/0069203 A1* | 3/2023 | Shinoda | F16C 17/022 |

FOREIGN PATENT DOCUMENTS

| | | |
|---|---|---|
| GB | 2571754 A | 9/2019 |
| WO | 0131162 A1 | 5/2001 |

OTHER PUBLICATIONS

Canadian Intellectual Property Office Examiner's Report dated Jan. 9, 2023 for Canadian Patent Application No. 3,119,831, 7 pages.
HarperCollins Publishers Ltd., "Aperture—Definition", https://www.collinsdictionary.com/dictionary/english/aperture, 2019.
Merriam-Webster Inc., "Through—Definition", http://web.archive.org/web/20201111232148/https://www.merriam-webster.com/dictionary/through, Nov. 11, 2020 (Nov. 11, 2020).
Canadian Intellectual Property Office Examiner's Report dated Aug. 17, 2023 for Canadian Patent Application No. 3,119,831, 6 pages.

* cited by examiner

APPARATUS AND METHOD FOR ASSEMBLING A SPLIT SLEEVE ONTO A SHAFT

CROSS-REFERENCE TO RELATED APPLICATIONS

This application is a divisional of U.S. patent application Ser. No. 17/324,325, filed on May 19, 2021, the content of which is hereby incorporated by reference in its entirety for all purposes.

TECHNICAL FIELD

The present disclosure relates to an apparatus and method for assembling a split sleeve onto a shaft, and more particularly, a split sleeve apparatus that may be mounted to a cylindrical shaft by heating and connecting the two halves of the split sleeve apparatus when placed on the shaft and allowing the split sleeve apparatus to cool on the shaft and create an interference fit on the shaft with no additional connectors and/or machining.

BACKGROUND

Bearings are commonly used to allow constrained relative movement between two or more parts, typically, rotary or linear movement. Hydrodynamic bearings have no "rolling" components and typically include a shaft rotatably received within a hole. The hole may be defined within a structural component, such as a portion of a machine or may be defined inside a bearing insert or housing.

Hydrodynamic bearings may be lubricated to reduce the friction between a journal, which may comprise an outer circumference of the shaft, and the bearing insert wall, thereby allowing the shaft to rotate efficiently against the non-moving bearing surface. However, in many applications, it may be necessary to place a sleeve over the shaft to act as a journal inside the bearing insert. The sleeve protects the shaft surface from abrasion and the normal wear caused by hydrodynamic bearings. Moreover, a sleeve may be used to replace or overlap the damaged portion of the shaft and prolong the life of the bearing. However, to effectively act as a journal inside the bearing insert, it is often desired to secure or connect the sleeve to a predetermined position on the shaft.

In some applications, a sleeve having an integrated locking collar is employed to both protect the shaft and secure the sleeve on the shaft. Such "locking sleeves" typically include a sleeve portion and a collar portion, wherein set screws are threaded into the collar portion to engage the shaft at different radial positions on the shaft. However, in operating environments that include frequent temperature cycling or that impose large amounts of lateral movement on the shaft, the setscrews often vibrate loose or shear, thereby resulting in damage to the shaft.

In other applications, it is known to heat a one-piece sleeve fabricated from a material, such as metal, having thermal expansion properties that allow the material to expand upon being heated and then contract upon being cooled. The one-piece sleeve is slid over and positioned onto the shaft. Once the sleeve is properly positioned, the sleeve is allowed to cool, thereby shrinking the sleeve onto the shaft and creating an interference fit with the shaft. Although the shrinking of the sleeve onto the shaft is an effective method of securing the sleeve to the shaft without connectors or setscrews, one piece sleeves can only be utilized on the end of a shaft or where the end of the shaft is accessible to slide the one-piece sleeve onto the shaft. Thus, this type of design and application cannot be utilized where the end or mid-portion of the shaft is not accessible, such as when repairing or replacing the sleeve without rebuilding or tearing down the machinery and equipment for which the shaft is utilized.

In those situations in which the end of the shaft is not accessible, it has been known to utilize a two piece sleeve design such that the two piece sleeve is assembled to a mid-portion of the shaft without having to slide the sleeve over the end of the shaft. Previous methods for assembling the two-piece sleeve onto the shaft include heating and over lapping two halves of the two-piece sleeve onto the shaft and welding together the ends of the two halves of the two piece sleeve. Once the sleeve cools, the sleeve shrinks onto the shaft, thereby creating an interference fit as described above. However, since the finish on the sleeve is critical due to the sleeve rotating on the hydrodynamic bearing, the outer diameter of the sleeve must be machined to a desired finish and size. Since these applications are intended to be utilized in the field where the shaft remains assembled to its respective equipment or machinery, the machining of the sleeve must take place in the field. Machining in the field is costly and time consuming, thereby creating inefficiencies that are undesirable in an industrial environment.

It would be desirable to provide an apparatus and method for installing a sleeve onto a mid-portion of a shaft that remains in the field without having access to the ends of the shaft. In addition, it would be desirable to provide an apparatus and method for installing a sleeve onto a mid-portion of a shaft without the need for connectors, setscrews, welds, and machining of the sleeve in the field.

SUMMARY

The present disclosure provides a split sleeve apparatus for assembling to a shaft. The split sleeve apparatus provides a first arcuate portion and a second arcuate portion with each portion having a partial cylindrical configuration and opposing circumferential ends. The first arcuate portion and the second arcuate portion each have at least one finger extending circumferentially outward from their opposing ends. The at least one finger from each of the first and second arcuate portions complementarily engage one another to form a continuous cylinder. At least one aperture extends longitudinally through the at least one finger of the opposing ends of each of the first and second arcuate portions. A dowel rod extends through each of the at least one aperture for connecting the first and second arcuate portions to form the continuous cylinder.

The first and second arcuate portions of the split sleeve apparatus are fabricated from a material having heat expansion characteristics that allow the material to expand when heated and to contract when cooled. The material may be fabricated from a stainless steel.

Each of the at least one finger of the first and second arcuate portions has a rectangular, arcuate configuration with rounded corners formed on a free end of each of the at least one finger. Each of the opposing ends of the first and second arcuate portions has a corresponding recess for complementarily receiving each of the at least one finger. Each of the at least one finger has a circumferential recess formed on the inner diameter of each of the at least one finger extending from a free end of the at least one finger. The recess formed in each of the at least one finger extends from the free end to a mid-portion of the at least one finger.

Each dowel rod of the split sleeve apparatus has an end extending beyond the first and second arcuate portions, and the end of each dowel rod has circumferential recesses for engaging and handling the split sleeve apparatus. A pair of dowel rods may extend through apertures provided at each of the opposing ends of the first and second arcuate portions.

Each of the first and second arcuate portions of the split sleeve apparatus has a semi-cylindrical configuration. The first and second arcuate portions may be mirror images of one another.

The method for assembling the split sleeve apparatus onto a shaft may comprise the steps of providing a first arcuate portion and a second arcuate portion, wherein the first and second arcuate portions have a partial cylindrical configuration with circumferential opposing ends having at least one finger extending from the opposing ends of the first and second arcuate portions. The method further includes providing apertures extending longitudinally through the at least one finger of the opposing ends of the first and second arcuate portions. The first and second arcuate portions are heated to allow the first and second arcuate portions to expand. The first and second arcuate portions are placed over the shaft, and the at least one finger on the opposing ends of the first and second arcuate portion complementarily engage one another to form a continuous cylinder over the shaft. The dowel rods are inserted into the apertures provided in the first and second arcuate portions. The first and second arcuate portions are cooled to allow the first and second arcuate portions to shrink and create an interference fit on the shaft.

The method of assembling the split sleeve apparatus to the shaft includes fabricating the first and second arcuate portions from a material having heat expansion characteristics that allow the first and second arcuate portions to expand upon being heated and contract upon being cooled. The method may further include providing stainless steel as the material for the first and second arcuate portions.

Each of the at least one finger may be provided with a rectangular, arcuate configuration with rounded corners formed on a free end of each of the at least one finger. Each of the opposing ends of the first and second arcuate portions are provided with a corresponding recess for complementarily receiving each of the at least one finger. Each of the at least one finger are provided with a circumferential recess formed on the inner diameter of each of the at least one finger and extending from a free end of the at least one finger.

The method may further include providing the first and second arcuate portions with a semi-cylindrical configuration. The first and second arcuate portions may be provided with semi-cylindrical configurations having mirror images of one another.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

With reference to FIGS. 1-6, the present disclosure provides for a split sleeve apparatus 10 and method for assembling and connecting the split sleeve apparatus 10 onto the outer diameter of a shaft 12 without the use of fasteners, welds, or machining. The shaft 12 may have a solid, cylindrical configuration and be fabricated from a metallic material. The shaft 12 may be utilized in various types of operations, and as a nonlimiting disclosure, the shaft 12 may be a turbine shaft in a power generation facility (not shown), such as a hydroelectric power plant (not shown). The shaft 12 may be rotationally supported by a type of journal assembly (not shown) and/or bearing assembly (not shown), and in a nonlimiting disclosure, the bearing may be a hydrodynamic bearing. The split sleeve apparatus 10 is connected to the outer diameter of the shaft 12 and acts as a journal, whereby the split sleeve apparatus 10 is located between the shaft 12 and the bearing such that the split sleeve apparatus 10 rotates against the bearing. The split sleeve apparatus 10 acts to protect the shaft 12 from any damage to the outer diameter of the shaft 12 that may be caused from the shaft 12 rotating against the bearing. In addition, the split sleeve apparatus 10 may act as a finished surface for the shaft 12 to rotationally engage the bearing.

The split sleeve apparatus 10 provides a first arcuate portion 14 and a second arcuate portion 16 that complementarily engage one another to form a continuous cylinder 17. The first and second arcuate portions 14, 16 each having opposing circumferential ends 18 with similar fingers 20 that extend circumferentially outward from the opposing ends 18 of each of the first and second arcuate portions 14, 16. Recesses 22 are formed between the fingers 20 of both the first and second arcuate portions 14, 16, and the recesses 22 have a similar shape as the fingers 20 so that the recesses 22 can complementarily or matingly receive the fingers 20. Apertures 24 extend longitudinally through the fingers 20 in the opposing ends 18 of the first and second arcuate portions 14, 16, and dowel rods 26 extend through the apertures 24 to connect the first arcuate portion 14 to the second arcuate portion 16 thereby forming the continuous cylinder 17 of the split sleeve apparatus 10.

In order to assemble the split sleeve apparatus 10 to the shaft 12, the first arcuate portion 14 and the second arcuate portion 16 are formed from separate and independent portions of the split sleeve apparatus 10. This allows the first and second arcuate portions 14, 16 to be assembled onto a mid-portion of the shaft 12 where the ends or portions of the shaft 12 are not accessible, thereby preventing a one-piece sleeve from being slid over the ends of the shaft 12. Furthermore, the preexisting sleeve or journal on the shaft 12 may be replaced without having to disassemble the shaft 12 from the machinery for which the shaft 12 is mounted therein. By not having to disassemble the shaft 12 from its associated machinery, a significant amount of time and money can be saved in replacing the preexisting journal or sleeve. The first and second arcuate portions 14, 16 of the split sleeve apparatus 10 may each have a semi-cylindrical configuration such that the first and second arcuate portions 14, 16 form the continuous cylinder 17 when the first and second arcuate portions 14, 16 are assembled to one another. In an alternative configuration, the first and second arcuate portions 14, 16 may comprise other various circumferential portions of the cylinder 17 of the split sleeve apparatus 10. For example, the first arcuate portion 14 may comprise 40% of the cylinder 17 while the second arcuate portion 16 may comprise 60% of the cylinder 17. So long as the first and second arcuate portions 14, 16 form the continuous cylinder 17 when assembled together, the first and second arcuate portions 14, 16 may comprise various portions of the entire cylinder 17 of the split sleeve apparatus 10.

To complementarily engage the first arcuate portion 14 to the second arcuate portion 16 of the split sleeve apparatus 10, the fingers 20 extend circumferentially outward from the opposing ends 18 of each of the first and second arcuate portions 14, 16. As shown in FIGS. 1-4, four fingers 20 may extend from each of the first and second arcuate portions 14, 16; however, the present invention is not limited to four fingers 20, but rather, any number of fingers 20 may be utilized depending on the clamping force that is desired to maintain the split sleeve apparatus 10 on the shaft 12. For instance, a larger number of fingers 20 will create more shearing points with the dowel rods 26 thereby creating a larger clamping force. However, a larger number of fingers 20 will require the fingers 20 to be smaller in size which will decrease the strength of each of the fingers 20. Therefore, consideration must be given as to the number and size of the fingers 20 when considering the clamping force required of the split sleeve apparatus 10 on the shaft 12.

Figure 6:
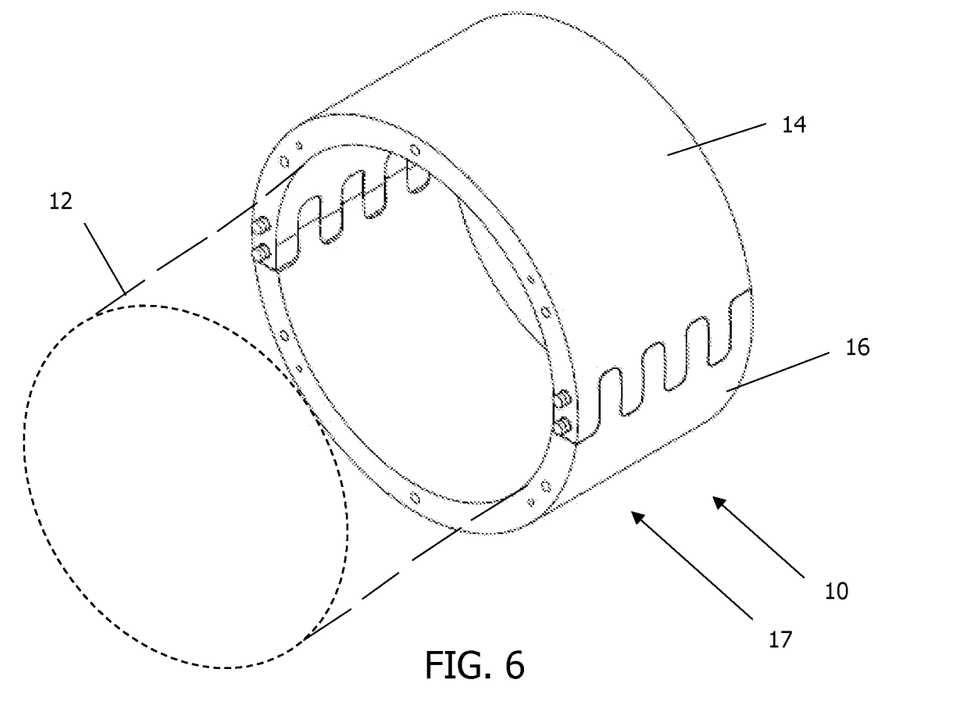
FIG. 6 is a side isometric view of the split sleeve apparatus of the present disclosure.
Figure 7:
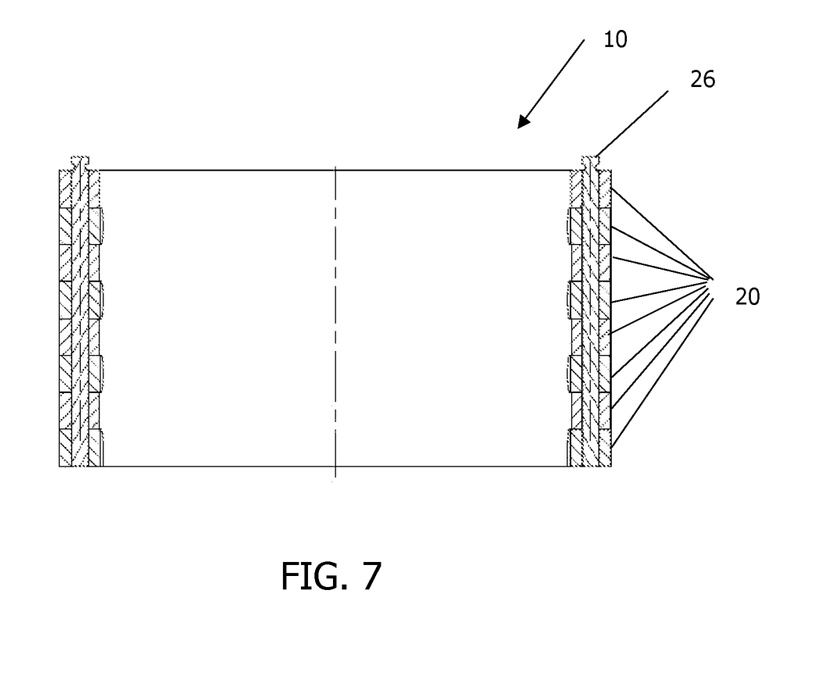
FIG. 7 is a sectional view of the split sleeve apparatus of the present disclosure shown in FIG. 6.
Figure 8:
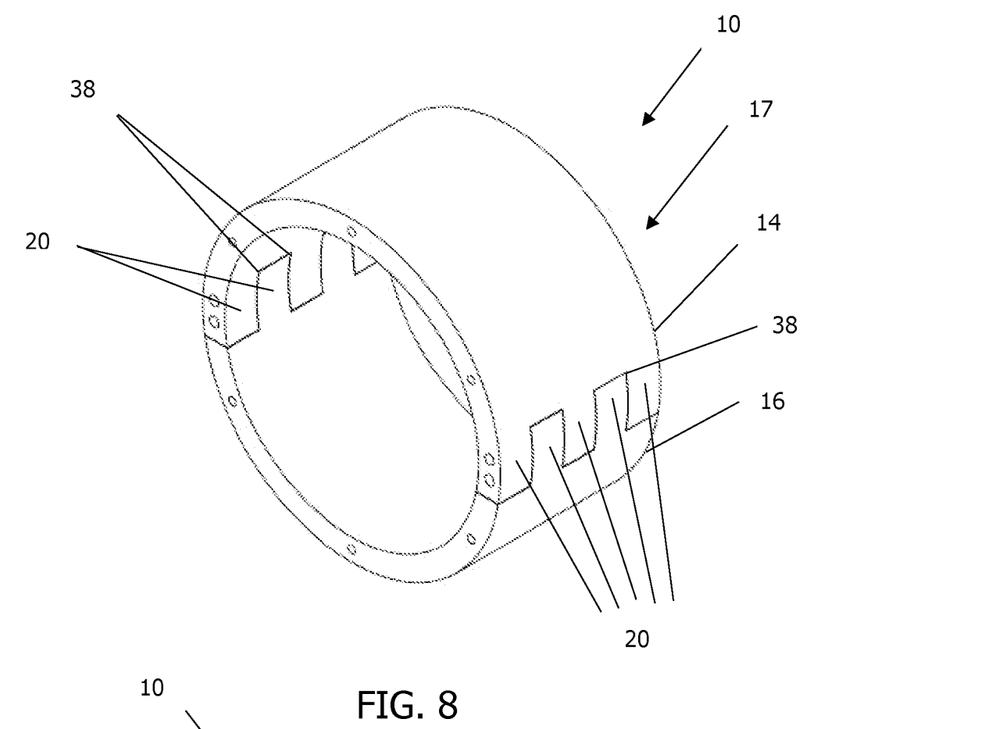
FIG. 8 is a side isometric view of the split sleeve apparatus of the present disclosure having square fingers.
Figure 9:
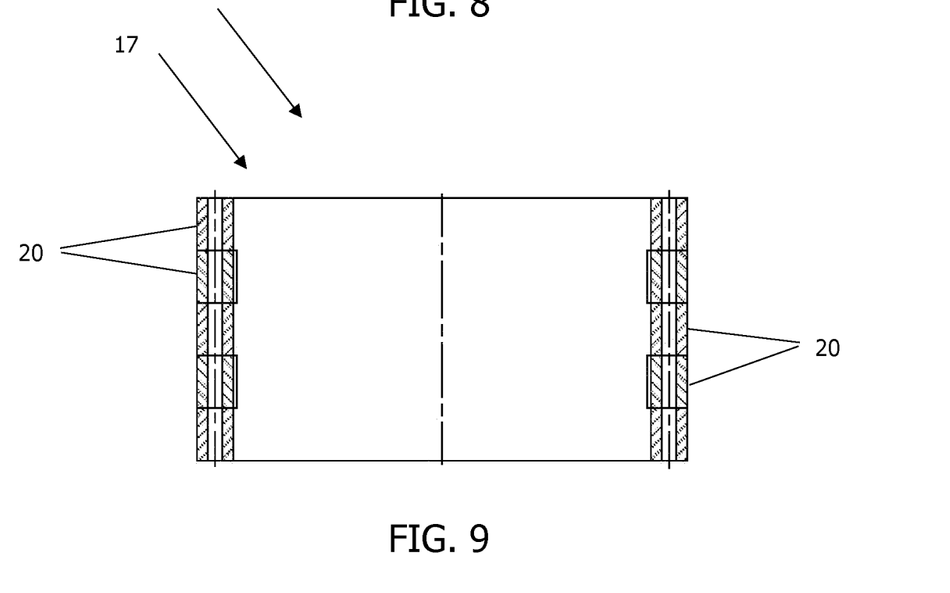
FIG. 9 is a second view of the split sleeve apparatus of the present disclosure shown in FIG. 8.

Each finger 20 has a rectangular, arcuate configuration that extends circumferentially outward from the opposing ends 18 of each of the first and second arcuate portions 14, 16 of the split sleeve apparatus. Each finger 20 has a free end 28 with rounded corners 36 formed thereon, except for the one finger 20 that extends along an outer face 30 of the first and second arcuate portions 14, 16, wherein the finger 20 has a square corner 38 adjacent the outer face 30 of the first and second arcuate portions 14, 16. In an alternative embodiment, all of the fingers 20 may have square corners 38 at their free ends 28, as shown in FIG. 6; however, such square corners 38 lend themselves to internal stresses that may limit the strength of the square corners 38 at the free ends 28 of the fingers 20. The recesses 22 are formed between the fingers 20 and have complementary configurations in order to complementarily or matingly receive the fingers 20. Each finger 20 also has a circumferential recess portion 32 on the inner diameter of the fingers 20. The recess portion 32 extends from the free end 28 of the fingers 20 to a midportion of the fingers 20. However, the present disclosure is not limited to the recess portion 32 extending to the midportion of the finger 20, but rather, the recess portion 32 may extend to any length of the inside diameter of the finger 20. The recess portion 32 on each finger 20 ensures that no interference will occur between the fingers 20 and the shaft 12 when the first and second arcuate portions 14, 16 are assembled together, as any interference between the fingers 20 and the shaft 12 may cause galling between the split sleeve apparatus 10 and the shaft 12. Since the first and second arcuate portions 14, 16 are designed to complementarily engage one another to form the continuous cylinder 17, the first and second arcuate portions 14, 16 are mirror images of one another. In other words, if either the first or second arcuate portions 14, 16 are flipped over, the first and second arcuate portions 14, 16 would have the same configuration.

Figure 1:
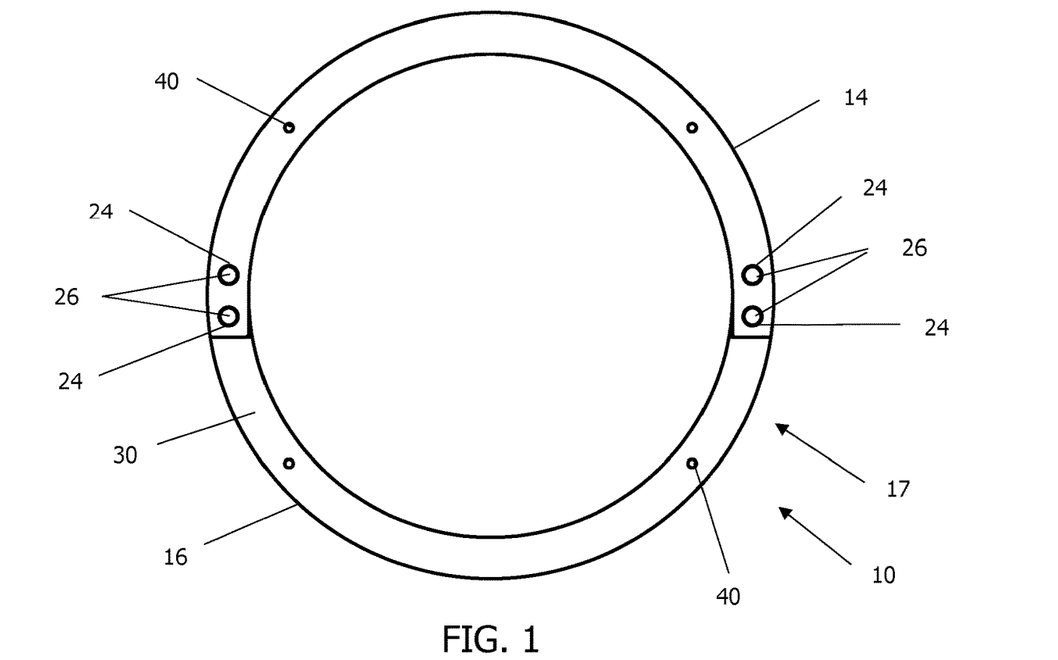
FIG. 1 is a top plan view of the split sleeve apparatus of the present disclosure.
Figure 2:
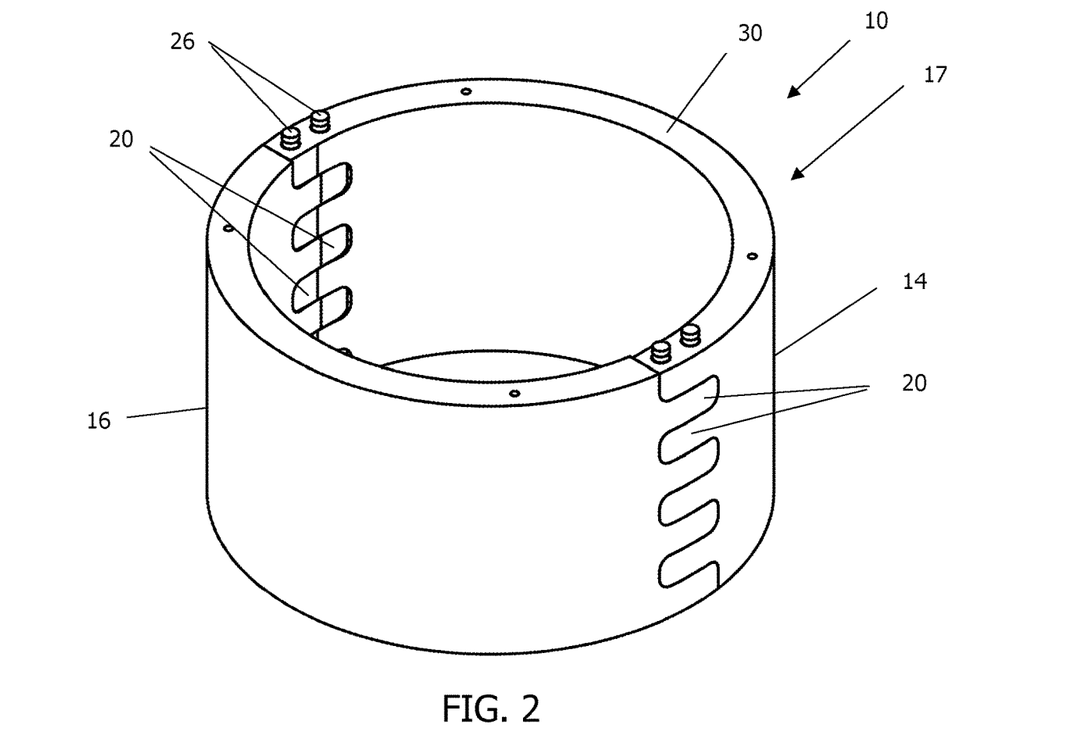
FIG. 2 is a front isometric plan view of the split sleeve apparatus of the present disclosure.
Figure 3:
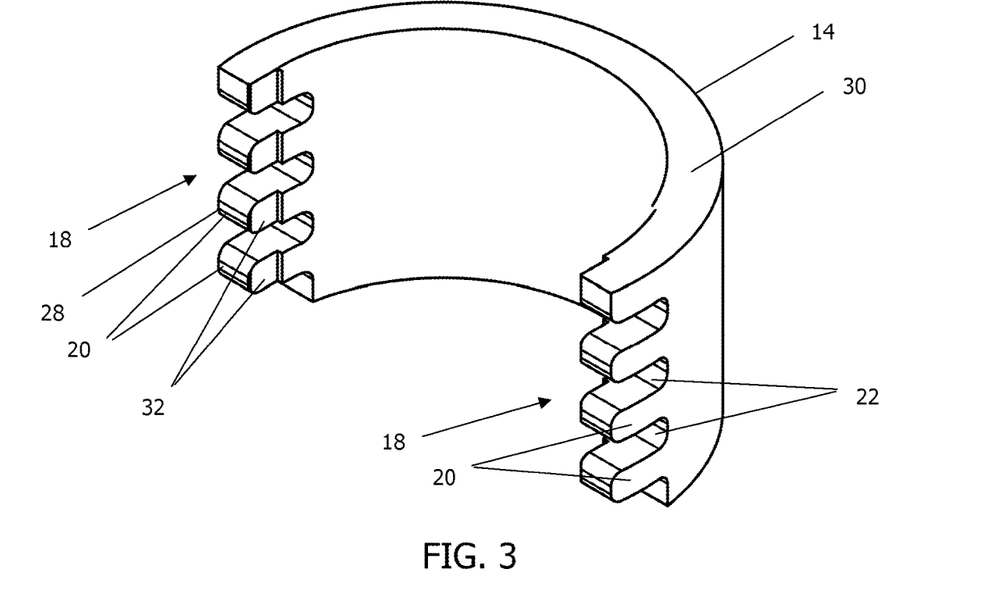
FIG. 3 is an isometric view of an arcuate portion of the split sleeve apparatus of the present disclosure.
Figure 4:
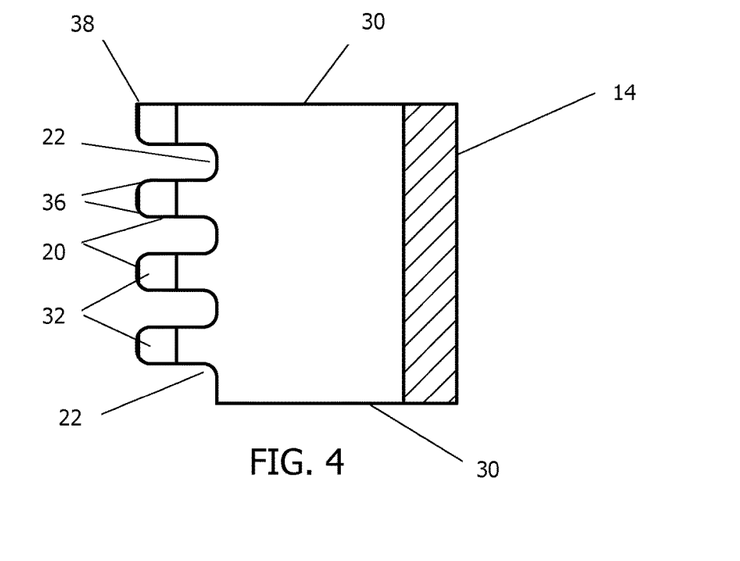
FIG. 4 is a sectional view of an arcuate portion of the split sleeve apparatus of the present disclosure.
Figure 5:
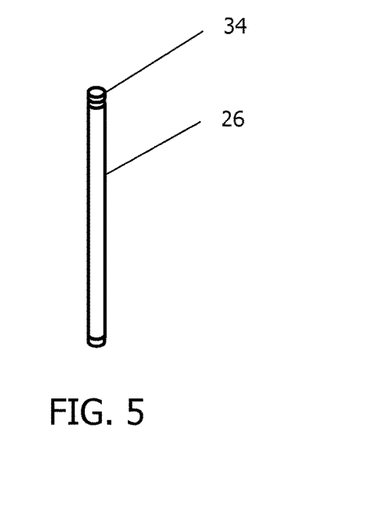
FIG. 5 is an isometric view of a dowel rod for the split sleeve apparatus of the present disclosure.

To hold and secure the first arcuate portion 14 to the second arcuate portion 16, the apertures 24 extend longitudinally through the outer faces 30 and the fingers 20 of the first and second arcuate portions 14, 16. Each of the apertures 24 receive one of the dowel rods 26 in order to connect the first arcuate portion 14 to the second arcuate portion 16 of the split sleeve apparatus 10. Each dowel rod 26 has an elongated cylindrical configuration and is fabricated from a material that is consistent with the desired clamping force of the split sleeve apparatus 10 on the shaft 12, as the dowel rods 26 realize shearing forces applied from the fingers 20 of the first and second arcuate portions 14, 16. Each dowel rod 26 may have annular recesses 40 at the ends of the dowel rods 26 to allow the handling of the split sleeve apparatus 10 by some form of material handling equipment (not shown). As shown in FIGS. 1-3, two apertures 24 are provided on each of the opposing ends 18 of the first and second arcuate portions 14, 16 for a total of four apertures 24; however, the present disclosure is not limited to four apertures 24, but rather, any number of apertures 24 and dowel rods 26 may be utilized depending on the level of clamping force that is desired of the split sleeve apparatus 10 on the shaft 12. As previously discussed, a greater number of dowel rods 26 will create a greater number of shear points with the fingers 20 of the first and second arcuate portions 14, 16, thereby increasing the clamping force of the split sleeve apparatus 10 onto the shaft 12. Yet, too many apertures 24 will weaken the fingers 20 thereby reducing the strength of the fingers 20. Thus, the number of apertures 24 and the dowel rods 26 must be considered with the number of fingers 20 when determining the amount of clamping force desired for the split sleeve apparatus 10 on the shaft 12.

In order to assemble the split sleeve apparatus 10 onto the shaft 12, the method of assembling the split sleeve apparatus onto to the shaft 12 discloses heating the first and second arcuate portions 14, 16 to a temperature in which the first and second arcuate portions 14, 16 may expand to a desired level. This requires that the first and second arcuate portions 14, 16 be fabricated from a material having known and desirable thermal expansion characteristics as well as a desired strength. Stainless steel may be utilized as a material to fabricate the first and second arcuate portions 14, 16, as stainless steel has the desired thermal expansion characteristics, hardness and strength while also providing a desirable smooth finish for rotatably engaging the bearing. However, the present disclosure is not limited to stainless steel as a material for fabricating the first and second arcuate portions 14, 16, but rather, any material having the desirable thermal expansion characteristics, hardness, strength, and finish may be utilized.

Heating of the first and second arcuate portions 14, 16 of the split sleeve apparatus 10 may be completed using various techniques. For instance, a heating blanket (not shown) may be utilized by wrapping the first and second arcuate portions 14, 16 with the heating blanket and allowing the heating blanket to heat the first and second arcuate portions 14, 16 to a desired temperature. Alternatively, heating ovens (not shown) may be utilized wherein the first and second arcuate portions 14, 16 are placed into the heating oven until the first and second arcuate portions 14, 16 reach a desired temperature. In another embodiment, heating rods (not shown) may be inserted into apertures 40 that extend longitudinally through the first and second arcuate portions 14, 16. Once the first and second arcuate portions 14, 16 reach a desired temperature, the heating rods may be removed from the apertures 40 in the first and second arcuate portions 14, 16. The level of heat is dependent on the material used to fabricate the first and second arcuate portions 14, 16; however, many materials, especially metallic materials, do not require a high level of heat to expand the necessary amount. In a non-limiting disclosure, the split sleeve apparatus 10 need only expand 0.1524 mm (0.006 inches) in diameter in order to fit the split sleeve apparatus 10 onto the shaft 12. Upon cooling, the split sleeve apparatus will contract an equal amount, thereby creating an interference fit with the shaft 12. However, it should be noted that the present disclosure is not limited to an expansion of 0.1524 mm (0.006 inches) in diameter, but rather, the amount of expansion and contraction is dependent on the size of the split sleeve apparatus 10 and the thermal expansion of the material.

Once the first and second arcuate portions 14, 16 are heated to a desired temperature, the first and second arcuate portions 14, 16 of the split sleeve apparatus 10 are fitted over the shaft 12 by having the inner diameter of the first and second arcuate portions 14, 16 overlie the shaft 12. The first and second arcuate portions 14, 16 are fitted together by complementarily engaging the fingers 20 and the recesses 22 of the first and second arcuate portions 14, 16. The apertures 24 in the opposing ends 18 of the first and second arcuate portions 14, 16 are aligned, and the dowel rods 26 are inserted through the apertures 24 to secure the first and second arcuate portions 14, 16 together. The first and second arcuate portions 14, 16 are allowed to cool, and upon doing so, the first and second arcuate portions 14, 16 contract or shrink onto the shaft 12 thereby creating an interference fit on the shaft 12. The contraction of the fingers 20 causes the fingers 20 to pull the dowel rods 26 in opposite directions thereby creating shear forces at stress points on the dowel rods 26 while maintaining the connection between the first and second arcuate portions 14, 16 on the shaft 12. The material of the dowel rods 26 is selected to support the shear forces that are created by the fingers 20 of the first and second arcuate portions 14, 16. In a non-limiting disclosure, the configuration of the fingers 20 and the dowel rods 26 shown in FIGS. 1-5, along with the use of stainless steel as a material for the first and second arcuate portions 14, 16, may lead to a clamping force of 50 tons applied by the split sleeve apparatus 10 to the shaft 12. Again, the clamping force may vary depending on the materials of the split sleeve apparatus 10, the number of fingers 20, and the number of dowel rods 26.

While the disclosure has been made in connection with what is presently considered to be the most practical and preferred embodiment, it should be understood that the disclosure is intended to cover various modifications and equivalent arrangements.

What is claimed is:

1. A method for assembling a split sleeve apparatus, the steps comprising:
    providing a first arcuate portion and a second arcuate portion wherein the first and second arcuate portions have a partial cylindrical configuration with circumferential opposing ends each having at least one finger that complementarily engage one another to form a continuous cylinder;
    providing apertures extending longitudinally through the opposing ends of the first and second arcuate portions wherein each of the apertures extends through both of the opposing ends of the first and second arcuate portions;
    heating the first and second arcuate portions to allow the first and second arcuate portions to expand;
    complementarily engaging the opposing ends of the first and second arcuate portions to form a continuous cylinder;
    inserting a dowel rod into each of the apertures provided in the first and second arcuate portions to connect the opposing ends of the first and second arcuate portions together; and
    cooling the first and second arcuate portions to allow the first and second arcuate portions to shrink and create shear forces on each dowel rod.

2. The method of assembling a split sleeve apparatus stated in claim 1, wherein the step of heating the first and second arcuate portions further comprises the steps of:
    wrapping a heating blanket around the first and second arcuate portions until the first and second arcuate portions reach a predetermined temperature.

3. The method of assembling a split sleeve apparatus stated in claim 1, wherein the step of heating the first and second arcuate portions further comprises the steps of:
    inserting the first and second arcuate portions into a heating oven until the first and second arcuate portions reach a predetermined temperature.

4. The method of assembling a split sleeve apparatus stated in claim 1, wherein the step of heating the first and second arcuate portions further comprises the steps of:
    inserting heating rods into the apertures of the first and second arcuate portions until the first and second arcuate portions reach a predetermined temperature.

5. The method of assembling a split sleeve apparatus stated in claim 1, wherein the step of heating the first and second arcuate portions further comprises the steps of:
    expanding the diameter of the continuous cylinder formed by the first and second arcuate portions by 0.1524 mm (0.006 inches).

6. The method of assembling a split sleeve apparatus stated in claim 1, further comprising the steps of:
    fabricating the first and second arcuate portions from a material having heat expansion characteristics that allow the first and second arcuate portions to expand upon being heated and to contract upon being cooled.

7. The method of assembling a split sleeve apparatus stated in claim 1, further comprising the steps of:
    providing stainless steel as the material for the first and second arcuate portions.

8. A method for assembling a split sleeve apparatus to a shaft, the steps comprising:
    providing a first arcuate portion and a second arcuate portion wherein the first and second arcuate portions have a partial cylindrical configuration with circumferential opposing ends having at least one finger extending from the opposing ends of the first and second arcuate portions;
    providing apertures extending longitudinally through the at least one finger of the opposing ends of the first and second arcuate portions;
    heating the first and second arcuate portions to allow the first and second arcuate portions to expand;
    placing the first and second arcuate portions over the shaft;

complementarily engaging the at least one finger on the opposing ends of the first and second arcuate portion to form a continuous cylinder over the shaft;

inserting dowel rods into the apertures provided in the first and second arcuate portions; and cooling the first and second arcuate portions to allow the first and second arcuate portions to shrink and create an interference fit on the shaft.

9. The method as stated in claim 8, further comprising the steps of:

fabricating the first and second arcuate portions from a material having heat expansion characteristics that allow the first and second arcuate portions to expand upon being heated and to contract upon being cooled.

10. The method as stated in claim 9, further comprising the steps of:

providing stainless steel as the material for the first and second arcuate portions.

11. The method as stated in claim 8, further comprising the steps of:

providing each of the at least one finger with a rectangular, arcuate configuration with rounded corners formed on a free end of each of the at least one finger; and providing each of the opposing ends of the first and second arcuate portions with a corresponding recess for complementarily receiving each of the at least one finger.

12. The method as stated in claim 8, further comprising the steps of:

providing each of the at least one finger with a circumferential recess formed on the inner diameter of each of the at least one finger and extending from a free end of the at least one finger.

13. The method as stated in claim 8, further comprising the steps of:

providing the first and second arcuate portions with a semi-cylindrical configuration.

14. The method as stated in claim 13, further comprising the steps of:

providing the first and second arcuate portions with semi-cylindrical configurations having mirror images of one another.

15. A method for assembling a split sleeve apparatus to a shaft, the steps comprising:

providing a first arcuate portion and a second arcuate portion wherein the first and second arcuate portions have a partial cylindrical configuration with circumferential opposing ends having at least one finger extending from the opposing ends of the first and second arcuate portions that complementarily engage one another to form a continuous cylinder;

fabricating the first and second arcuate portions from a material having heat expansion characteristics that allow the first and second arcuate portions to expand upon being heated and to contract upon being cooled;

providing apertures extending longitudinally wherein each aperture extends through the at least one finger of each of the opposing ends of the first and second arcuate portions;

heating the first and second arcuate portions to allow the first and second arcuate portions to expand by at least 0.1524 mm (0.006 inches) of the cylinder diameter;

placing the first and second arcuate portions over the shaft;

complementarily engaging the at least one finger on the opposing ends of the first and second arcuate portion to form the continuous cylinder over the shaft;

inserting dowel rods into the apertures provided in the first and second arcuate portions; and cooling the first and second arcuate portions to allow the first and second arcuate portions to shrink and create an interference fit on the shaft.

16. The method as stated in claim 15, further comprising the steps of:

providing each of the at least one finger with a rectangular, arcuate configuration with rounded corners formed on a free end of each of the at least one finger; and providing each of the opposing ends of the first and second arcuate portions with a corresponding recess for complementarily receiving each of the at least one finger.

17. The method as stated in claim 15, further comprising the steps of:

providing each of the at least one finger with a circumferential recess formed on the inner diameter of each of the at least one finger and extending from a free end of the at least one finger.

18. The method as stated in claim 15, further comprising the steps of:

providing the first and second arcuate portions with semi-cylindrical configurations having mirror images of one another.

19. The method of assembling a split sleeve apparatus to a shaft stated in claim 15, further comprising the steps of:

providing stainless steel as the material for the first and second arcuate portions.

* * * * *